United States Patent
Cheung et al.

(10) Patent No.: US 9,435,400 B2
(45) Date of Patent: Sep. 6, 2016

(54) DRIVE UNIT

(71) Applicant: Johnson Electric S.A., Murten (CH)

(72) Inventors: Chi Wang Cheung, Hong Kong (CN); Zhong Ping Wu, Shenzhen (CN); Hong Yu Ding, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 191 days.

(21) Appl. No.: 13/768,305

(22) Filed: Feb. 15, 2013

(65) Prior Publication Data

US 2013/0213166 A1 Aug. 22, 2013

(30) Foreign Application Priority Data

Feb. 17, 2012 (CN) .......................... 2012 1 0037101

(51) Int. Cl.
*F16H 1/16* (2006.01)
*F16H 57/00* (2012.01)

(52) U.S. Cl.
CPC ............ *F16H 1/16* (2013.01); *F16H 57/0025* (2013.01); *Y10T 74/19828* (2015.01)

(58) Field of Classification Search
CPC ..... F16H 57/0025; F16H 1/16; B21D 39/04; B21D 39/048
USPC ........... 74/425, 724; 403/185, 277, 361, 383
See application file for complete search history.

(56) References Cited

U.S. PATENT DOCUMENTS

| | | | | |
|---|---|---|---|---|
| 4,699,017 A | * | 10/1987 | Periou | 74/425 |
| 5,152,631 A | * | 10/1992 | Bauer | 403/372 |
| 5,213,000 A | * | 5/1993 | Saya | F16C 17/08 |
| | | | | 264/262 |
| 5,216,929 A | * | 6/1993 | Ochiai | F16H 1/16 |
| | | | | 74/425 |
| 5,404,060 A | * | 4/1995 | Nakahashi | F16H 55/06 |
| | | | | 29/893.37 |
| 5,564,308 A | | 10/1996 | Hoshikawa et al. | |
| 6,223,615 B1 | * | 5/2001 | Huck | 74/425 |
| 6,386,056 B1 | * | 5/2002 | Bachnak | B62D 5/0403 |
| | | | | 74/425 |
| 6,463,829 B2 | * | 10/2002 | Torii | H02K 5/10 |
| | | | | 74/425 |
| 7,584,682 B2 | * | 9/2009 | Hsiao | 74/425 |
| 7,662,240 B2 | * | 2/2010 | Bishop | C21D 9/32 |
| | | | | 148/220 |
| 7,712,391 B2 | * | 5/2010 | Hofschulte et al. | 74/425 |
| 7,717,689 B2 | * | 5/2010 | Sato et al. | 418/171 |
| 7,898,132 B2 | * | 3/2011 | Hong | 310/90 |
| 8,847,462 B2 | * | 9/2014 | Filgertshofer | 310/216.121 |
| 2006/0193683 A1 | * | 8/2006 | Yokoo et al. | 403/256 |
| 2009/0095106 A1 | * | 4/2009 | Hollender et al. | 74/425 |
| 2009/0162134 A1 | * | 6/2009 | Fukumura | F16D 1/072 |
| | | | | 403/1 |

* cited by examiner

*Primary Examiner* — Terence Boes

(74) *Attorney, Agent, or Firm* — Muncy, Geissler, Olds & Lowe, P.C.

(57) ABSTRACT

A drive unit includes an electric motor, a worm shaft coupled to the motor, a worm gear engaging with the worm shaft, and an output shaft connected to the worm gear. The motor has a motor shaft on which the worm shaft is fixed. The worm shaft is made of plastic. The drive unit further includes a metallic sleeve press fitted to the motor shaft. An outer profile of the sleeve is non-circular. A correspondingly shaped receiving hole is formed in the worm shaft to receive the sleeve. The sleeve rotates with the motor shaft and drives the worm shaft.

14 Claims, 3 Drawing Sheets

DRIVE UNIT

CROSS REFERENCE TO RELATED APPLICATIONS

This non-provisional patent application claims priority under 35 U.S.C. §119(a) from Patent Application No. 201210037101.7 filed in The People's Republic of China on Feb. 17, 2012.

FIELD OF THE INVENTION

This invention generally relates to a drive unit, and particularly to a drive unit comprising an electric motor driving an output via a worm and worm gear.

BACKGROUND OF THE INVENTION

Such a drive unit usually comprises a motor, a worm shaft and a worm gear. The worm shaft connects the shaft of the motor to the worm gear, and transmits output of the motor to the worm gear. Traditional drive units use a metal worm shaft pressed onto the motor shaft and a metal worm gear. To lower the cost, plastic worms and worm gears have replaced the metal worms and worm gears. However, how to effectively and efficiently transmit the motor torque to a plastic worm shaft is a subject to be resolved. One solution is to make the motor shaft with a D-shaped cross section at a portion where the worm shaft is fixed, and to make the worm shaft with a correspondingly shaped mounting hole. The worm shaft is fixed on to the D-shaped portion and directly driven by the motor shaft. However, this reduces the diameter of the motor shaft resulting in a decrease in the strength of the motor shaft. The motor shaft is vulnerable to bending due to the relatively large output torque of the motor, resulting in poor meshing between the worm shaft and the worm gear, even malfunction of the drive unit.

Hence, there is a desire for an improved drive unit.

SUMMARY OF THE INVENTION

Accordingly, in one aspect thereof, the present invention provides a drive unit comprising: a motor having a motor shaft, a worm shaft made of plastic and fixed to the motor shaft, a worm gear engaging with the worm shaft, an output shaft coupled to the worm gear; and a metal sleeve fixed to the motor shaft by a press fit connection, the sleeve having an outer profile that is non-circular, wherein a receiving hole is formed in the worm shaft for receiving the sleeve, the receiving hole has a profile corresponding to the outer profile of the sleeve, and the sleeve rotates with the motor shaft and drives the worm shaft.

Preferably, the profile of the receiving hole is slightly smaller than the outer profile of the sleeve and the sleeve is a press fit in the receiving hole.

Preferably, the outer profile the sleeve is a square.

Preferably, the outer profile of the sleeve is a polygon.

Preferably, the sleeve is made of powder metallurgy material.

Preferably, the powder metallurgy material is copper powder, iron powder or a combination thereof.

Preferably, the plastic of the worm shaft is a glass fiber filled plastic.

Preferably, radial outward protrusions are formed on the motor shaft, and the protrusions press against an inner surface of the worm shaft, forming elastic deformation of the inner surface to prevent relative rotational displacement between the worm shaft and the motor shaft.

Preferably, each of the protrusions is strip-shaped and extends in an axial direction of the motor shaft.

Preferably, the protrusions are parallel to each other, and spaced from each other.

Preferably, the protrusions are arranged at a position corresponding to a middle portion of the worm shaft to prevent relative axial displacement between the worm shaft and the motor shaft.

Preferably, the protrusions are linear knurls.

Preferably, the worm shaft has an end portion and an engagement portion that extends from the end portion; a worm in the form of a helical gear is formed at a radially outer surface of the engagement portion; the receiving hole is formed in a center portion of the end portion; and a shaft hole is formed along the axis of the engagement portion to receive the motor shaft.

Preferably, the shaft hole in the engagement portion is a through hole and the motor shaft extends through the worm shaft.

Preferably, a distal end of the motor shaft protruding from the worm shaft is supported by a bearing.

A drive unit according to the present invention uses a sleeve that is press fitted onto the motor shaft to transmit the torque of the motor shaft to the worm shaft, to overcome the problem of how to reliably connect the plastic worm shaft to the motor shaft, without compromising the strength of the motor shaft.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF VARIOUS EMBODIMENTS

Figure 1:
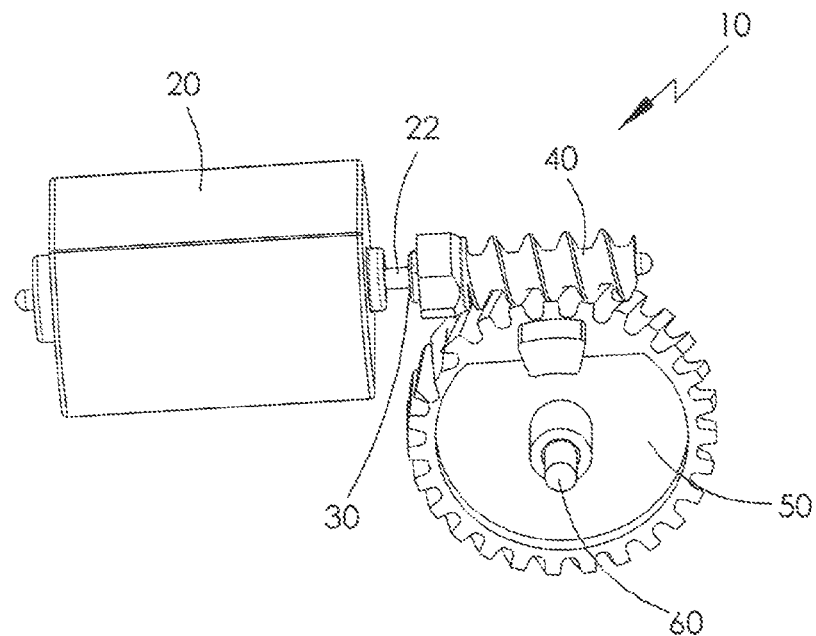
FIG. 1 illustrates an drive unit according to an exemplary embodiment of the present invention, with a housing removed, showing a motor, motor shaft, sleeve, worm shaft and worm gear.
Figure 2:
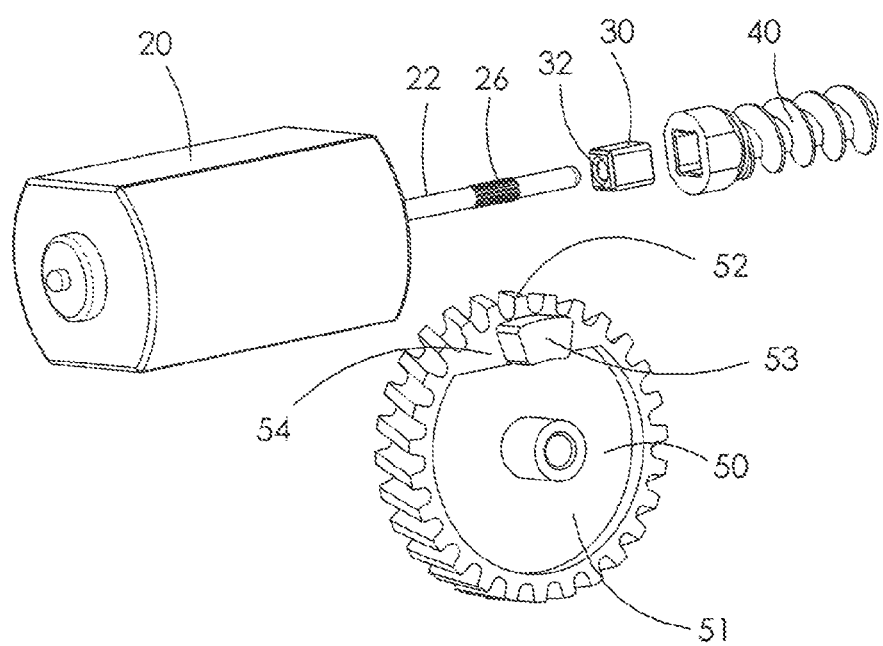
FIG. 2 is an exploded view of the drive unit of FIG. 1.

Referring to FIG. 1 and FIG. 2, a drive unit 10, according to an exemplary embodiment of the present invention, comprises a motor 20 having a motor shaft 22, a sleeve 30 tightly sleeved on the motor shaft 22, a worm shaft 40 fitted to the motor shaft 22 and the sleeve 30, a worm gear 50 engaged with the worm shaft 40, and an output shaft 60 coupled to the worm gear 50. The output shaft 60 couples to a driven member (not shown). During operation of the drive unit 10, the motor 20 rotates the worm shaft 40 by way of the sleeve 30, and the worm shaft 40 rotates the worm gear 50. In this manner, the torque of motor 20 is transmitted to the driven member.

Figure 3:
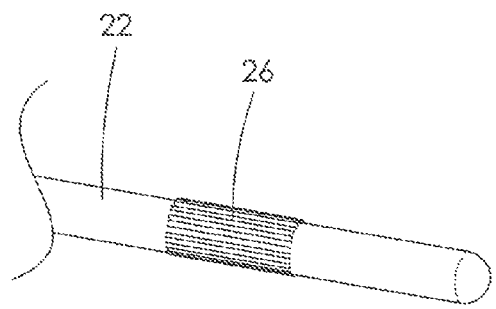
FIG. 3 is an enlarged view of a portion of the motor shaft of FIG. 1.

FIG. 3 is an enlarged detail view of a portion of the distal end of the motor shaft 22. As shown, the motor shaft is right cylindrical, i.e. the motor shaft has a circular cross section. Preferably, a number of protrusions 26 are formed on the motor shaft 22. Each of the protrusion protrudes radially and outwardly. More specifically, each protrusion 26 is strip-shaped and extends along an axial direction of the motor shaft 22. The protrusions 26 are arranged in a circumferential direction of the motor shaft 22, with each protrusion 26 parallel to and spaced from other protrusions. Ideally, the protrusions are parallel or linear knurls.

Figure 4:
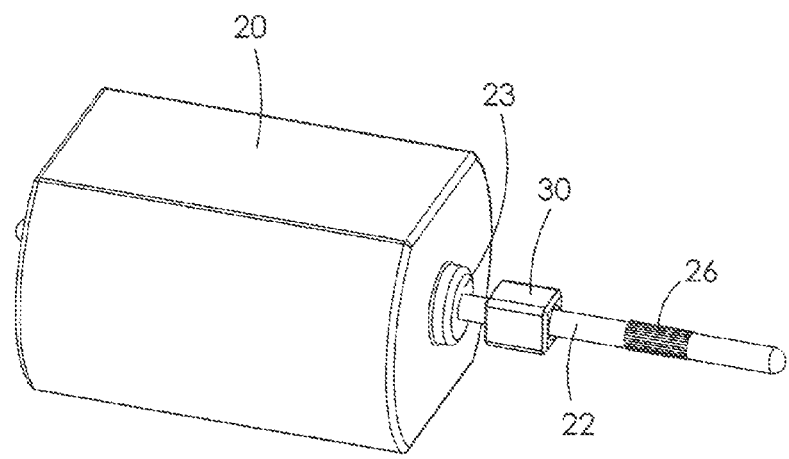
FIG. 4 shows the motor and sleeve of FIG. 1.

As shown in FIG. 4, a through hole 32 is formed in the center of the sleeve 30. The motor shaft 22 is pressed through the through hole 32 whereby the sleeve 30 is fixedly mounted to the motor shaft 22 by a press fit connection. Preferably, prior to forming the protrusions 26 on the motor shaft 22, the sleeve 30 is mounted on the motor shaft 22 to allow the press fit connection between the motor shaft 22 and the sleeve 30. The position of the sleeve 30 on the motor shaft 22 is controlled by a press fit tooling. The sleeve 30 is made of metal material. Preferably, the sleeve 30 is formed by a sintered powder metallurgy material such as copper powder, iron powder, the combination of copper powder and iron powder, etc. Preferably, the sleeve has a radial section, which is square. A radial section is defined as a section formed when cut by a plane extending perpendicularly to the axis of the through hole 32 of the sleeve. Alternatively, the radial section of the sleeve 30 could be other non-circular shapes, such as rectangular and other polygons.

Figure 5:
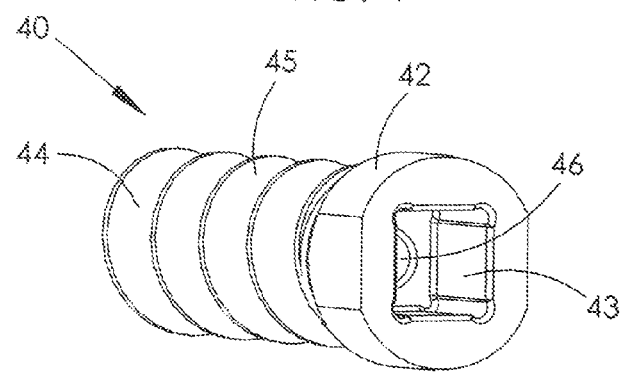
FIG. 5 illustrates the worm shaft of FIG. 1.
Figure 6:
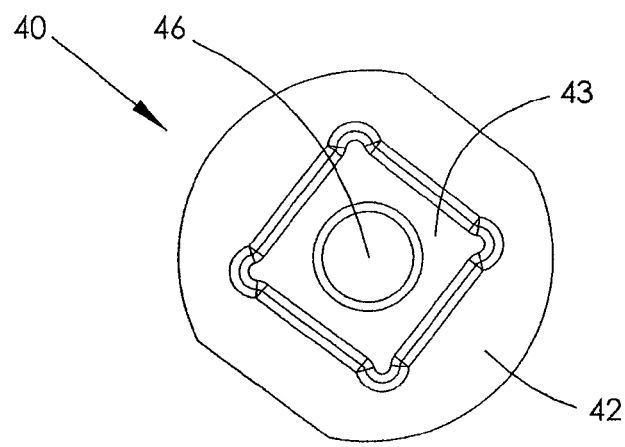
FIG. 6 is an end view of the worm shaft of FIG. 5.

Referring to FIG. 5 and FIG. 6, the material of the worm shaft 40 is plastic. Preferably, the plastic is a glass fiber filled plastic to enhance abrasion performance of the worm shaft. The worm shaft 40 has an end portion 42 and an engagement portion 44 that extends axially from the end portion 42. The end portion 42 is cylindrical, with a receiving hole 43 formed in the center for receiving the sleeve 30. The shape of the receiving hole 43 matches the shape of the sleeve 30, and the size of the receiving hole 43 is slightly smaller than the size of the sleeve 30, so that the sleeve 30 is an interference fit in the receiving hole of the worm shaft 40. The outer diameter of engagement portion 44 is smaller than the outer diameter of end portion 42. A worm, in the form of a helical gear 45, is formed on the radially outer surface of the engagement portion 44 to engage teeth of the worm gear 50. A shaft hole 46, extending in the axial direction of the worm shaft 40, is formed at the center portion of the engagement portion 44. Shaft hole 46 is concentric with and connected to the receiving hole 43. The diameter of shaft hole 46 is slightly smaller than the diameter of the motor shaft 22.

Figure 7:
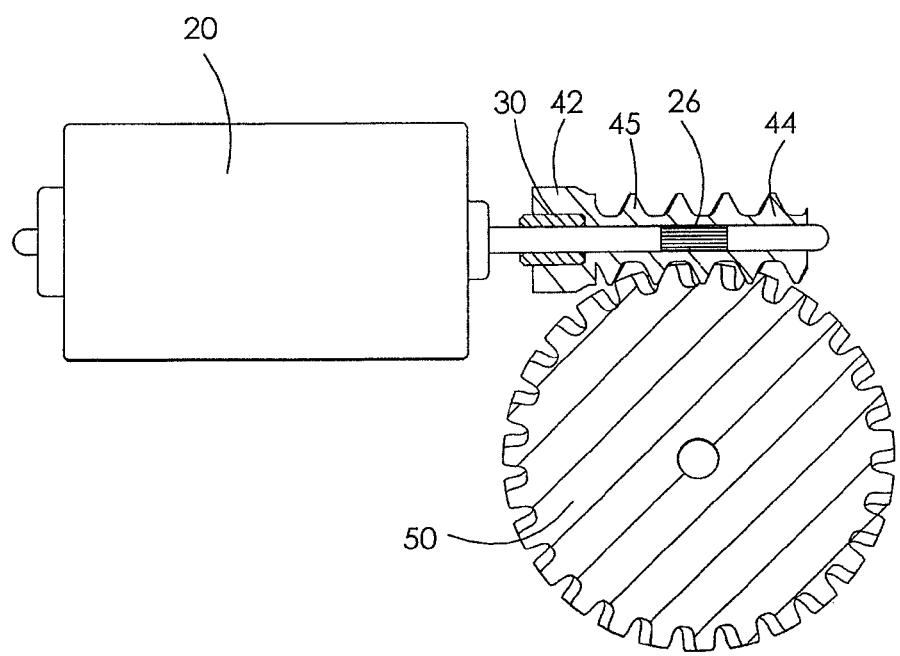
FIG. 7 is a partial sectional view of the drive unit of FIG. 1.

Referring to FIG. 7, the worm shaft 40 is a press fit on the motor shaft 22 and the sleeve 30. Since the sleeve 30 is fixed to the motor shaft 22 by a press fit connection, the sleeve 30 rotates with the motor shaft 22. In addition, the shape of the radial section of the sleeve 30 is non-circular, and the sleeve 30 is received in the receiving hole 43 whose shape matches the shape of the sleeve 30. As such, relative rotational displacement between the sleeve 30 and the worm shaft 40 is prevented. Therefore, the torque of the motor is transmitted to the worm shaft 40 via the sleeve 30.

Preferably, hole 46 is a through hole. This allows the motor shaft to extend through the worm shaft 40 to support the entire length of the worm shaft against bending caused by radial forces generated between the worm and the worm gear. In addition, the exposed distal end of the motor shaft 22 may be supported by a bearing or the like, if desired. This gives better resistance to deformation of the worm during heavy loading of the drive unit.

Furthermore, during assembly of the worm shaft 40, the protrusions 26 press against an inner surface of the shaft hole 46 in the worm shaft 40, so that inward elastic deformation occurs at the inner surface of the worm shaft 40 to further prevent rotational displacement between the worm shaft 40 and the motor shaft 22. In addition, the protrusions 26 are formed at a location corresponding to an axially middle portion of the engagement portion 44. As such, the inner surface of the engagement portion 44 comprises a center portion that has elastic deformation and two axial portions that have no elastic deformation and axially press against the ends of the protrusions 26, respectively. Therefore, axial movement between the worm shaft 40 and the motor shaft 22 is prevented.

Alternatively, the protrusions 26 are linear knurls which bite into the worm shaft to resist relative rotational and axial movement between the worm shaft 40 and the motor shaft 22.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A drive unit comprising:
   a motor having a motor shaft;
   a worm shaft made of plastic and fixed to the motor shaft, the worm shaft including a through hole, wherein the motor shaft extends through the through hole to support an entire length of the worm shaft;
   a worm gear engaging with the worm shaft;
   an output shaft coupled to the worm gear; and
   a metal sleeve fixed to the motor shaft by a press fit connection and being surroundingly in direct contact with the motor shaft, the sleeve having an outer profile that is non-circular,
   wherein a receiving hole is formed in the worm shaft for receiving the sleeve, the receiving hole has a profile corresponding to the outer profile of the sleeve,
   wherein the sleeve rotates with the motor shaft and drives the worm shaft,
   wherein the outer profile of the sleeve is a square, and
   wherein the profile of the receiving hole is smaller than the outer profile of the sleeve and the sleeve is connected to the receiving hole by a press fit connection.

2. The drive unit of claim 1, wherein the sleeve is made of powder metallurgy material.

3. The drive unit of claim 2, wherein the powder metallurgy material is copper powder, iron powder or a combination thereof.

4. The drive unit of claim 1, wherein the plastic of the worm shaft is a glass fiber filled plastic.

5. The drive unit of claim 1, wherein radial outward protrusions are formed on the motor shaft on a side of the sleeve away from the motor, and
   the protrusions press against an inner surface of the worm shaft, forming elastic deformation of the inner surface to prevent relative rotational displacement between the worm shaft and the motor shaft.

6. The drive unit of claim 5, wherein each of the protrusions is strip-shaped and extends in an axial direction of the motor shaft.

7. The drive unit of claim 6, wherein the protrusions are parallel to each other, and spaced from each other.

8. The drive unit of claim 5, wherein the protrusions are arranged at a position corresponding to a middle portion of the worm shaft to prevent relative axial displacement between the worm shaft and the motor shaft.

9. The drive unit of claim 5, wherein the protrusions are linear knurls.

10. The drive unit of claim 5, wherein the worm shaft has an end portion and an engagement portion that extends from the end portion;
a worm in the form of a helical gear is formed at a radially outer surface of the engagement portion; and
the receiving hole is formed in a center portion of the end portion.

11. The drive unit of claim 10, wherein the protrusions are arranged at a position corresponding to a middle portion of the worm shaft to prevent relative axial displacement between the worm shaft and the motor shaft and the protrusions press against an inner surface of the engagement portion, and
wherein an inner surface of the engagement portion has a center portion having elastic deformation and two axial portions devoid of elastic deformation, and the two axial portions press against ends of the protrusions.

12. The drive unit of claim 1, wherein a distal end of the motor shaft protruding from the worm shaft is supported by a bearing.

13. A drive unit comprising:
a motor having a motor shaft;
a worm shaft made of plastic and fixed to the motor shaft, the worm shaft including a axial through hole, wherein the motor shaft extends through the axial through hole to support an entire length of the worm shaft, the worm shaft defining a receiving hole;
a worm gear engaging with the worm shaft;
an output shaft coupled to the worm gear; and
a metal sleeve fixed to the motor shaft by a press fit connection and being surroundingly in direct contact with the motor shaft,
wherein the metal sleeve is received in the receiving hole of the worm shaft, the metal sleeve having a non-circular outer profile and the receiving hole having a profile corresponding to the outer profile of the sleeve;
wherein the motor shaft forms radial outward protrusions which press against an inner surface of the worm shaft, the protrusions being axially spaced from the metal sleeve; and
wherein the sleeve rotates with the motor shaft and drives the worm shaft.

14. The drive unit of claim 13, wherein the outer profile of the sleeve is a square.

* * * * *